United States Patent
Henkel et al.

(10) Patent No.: US 10,439,961 B2
(45) Date of Patent: Oct. 8, 2019

(54) NETWORK FABRIC CONTROL (71) Applicant: HEWLETT PACKARD ENTERPRISE DEVELOPMENT LP, Houston, TX (US)

(72) Inventors: Michael Henkel, Ruesselsheim, TX (US); Burson Keith Patton, Plano, TX (US); Marc Cottington, Bracknell (GB)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/307,662

(22) PCT Filed: Apr. 30, 2014

(86) PCT No.: PCT/US2014/036034
§ 371 (c)(1),
(2) Date: Oct. 28, 2016

(87) PCT Pub. No.: WO2015/167489
PCT Pub. Date: Nov. 5, 2015

(65) Prior Publication Data
US 2017/0048168 A1 Feb. 16, 2017

(51) Int. Cl.
*H04L 12/947* (2013.01)
*H04L 12/64* (2006.01)
(Continued)

(52) U.S. Cl.
CPC .......... *H04L 49/25* (2013.01); *H04L 12/4641* (2013.01); *H04L 12/6418* (2013.01);
(Continued)

(58) Field of Classification Search
CPC . H04L 45/50; H04L 12/6418; H04L 12/4641; H04L 41/0816; H04L 45/12; H04L 49/25; B60R 25/008
See application file for complete search history.

(56) References Cited

U.S. PATENT DOCUMENTS

| 8,130,641 B2 | 3/2012 | Wong et al. |
| 2004/0089034 A1* | 5/2004 | Yu .......................... B60R 25/008 70/199 |

(Continued)

OTHER PUBLICATIONS

"Optimizing Cloud Infrastructure with Software-Defined Networking," Oct. 12, 2011, pp. 1-8, White Paper, Vello Systems, Inc., USA.
(Continued)

*Primary Examiner* — Vinncelas Louis
(74) *Attorney, Agent, or Firm* — Trop, Pruner & Hu, P.C.

(57) ABSTRACT

Techniques for controlling a network fabric are disclosed. Labels are assigned to paths between endpoints in the network fabric. Switches in the path are configured to communicate data communication packets having the label along the path. Upon receiving a first data communication packet from a first one of the switches in the network fabric for communication to a destination endpoint over the network fabric, the label for a path from the first switch to the destination is obtained, the first packet is communicated to the destination endpoint and the first switch is caused to communicate subsequent data communication packets corresponding to the first data communication packet over the path.

14 Claims, 9 Drawing Sheets

(51) Int. Cl.
*H04L 12/46* (2006.01)
*H04L 12/24* (2006.01)
*H04L 12/721* (2013.01)
*H04L 12/723* (2013.01)

(52) U.S. Cl.
CPC .......... *H04L 41/0816* (2013.01); *H04L 45/12* (2013.01); *H04L 45/50* (2013.01)

(56) References Cited

U.S. PATENT DOCUMENTS

| | | |
|---|---|---|
| 2005/0089034 A1 | 4/2005 | Sakata et al. |
| 2009/0041019 A1 | 2/2009 | He et al. |
| 2009/0154461 A1 | 6/2009 | Kitani et al. |
| 2010/0091647 A1 | 4/2010 | Li et al. |
| 2012/0027018 A1 | 2/2012 | Ilyadis |
| 2012/0213225 A1* | 8/2012 | Subramanian .......... H04L 45/50 370/392 |

OTHER PUBLICATIONS

IBM, "Software Defined Networking," Oct. 2012, pp. 1-6, Thought Leadership White Paper, IBM Corporation, USA.
International Search Report and Written Opinion, International Application No. PCT/US2014/036034, dated Jan. 14, 2015, pp. 1-8, KIPO.
Jason Nolet, "A Data Center for the Future; How to Make It a Reality," Sep. 6, 2013, pp. 1-5, The Data Center Journal.
S. Jose, "Brocade Unites Physical and Virtual Networking to Enable the On-Demand Data Center," Apr. 30, 2013, pp. 1-3, Brocade Communications Systems, Inc.

* cited by examiner

NETWORK FABRIC CONTROL

BACKGROUND

In a network fabric of a data communication network, network nodes are interconnected by network elements such as switches. Network fabrics for large entities such as enterprises can span different buildings, states or even countries. Network fabrics may also accommodate different tenants whose businesses are independent of each other.

BRIEF DESCRIPTION OF THE DRAWINGS

The accompanying drawings illustrate various examples and are a part of the specification. The illustrated examples are examples and do not limit the scope of the claims. Throughout the drawings, identical reference numbers designate similar, but not necessarily identical elements.

The same part numbers designate the same or similar parts throughout the figures.

DETAILED DESCRIPTION

A physical network fabric can be used to interconnect network nodes such as computing devices, links to other networks, appliances, printers and the like. A physical network fabric can include hardware switches having wired and/or wireless connections to network nodes.

A virtual network fabric can be used to interconnect network nodes such as computing devices, links to other networks, appliances, printers and the like. A virtual network fabric can be provided by one or more software applications executing on a computer system. A virtual network fabric may overlay one or more physical network fabrics and be presented to network nodes without reference to the underlying physical network fabric.

The term Software Defined Networking (SDN) is used herein to refer to network fabrics in which the control plane of the network fabric is decoupled from the data plane. In an SDN environment, the network fabric can be changed under the control of an SDN controller.

One difficulty with physical network fabrics is that they require manual management to change the network fabric. For example, physical network devices are often configured through a command line interface from a computing device locally connected to the network device. Another problem is that wired links between network equipment such as switches and other nodes in the network fabric often must be manually changed in order to change the network fabric. This is a labour intensive activity that requires a technician to visit the physical location of the network equipment. Typical problems include high labour costs associated with network fabric changes and delays due to having to wait for the necessary technician to be in place to make the change.

Another problem is that when large changes to a network fabric are intended and the network equipment to be changed is spaced apart, there can be delays and network outages while all the changes are made and the technician(s) make their way around the network equipment.

In virtual network fabrics, the underlying physical network fabric is abstracted from the virtual network fabric. One problem is that the use of an overlay network hides from the underlying physical infrastructure all of the entropy in the packet headers of data being transported through the overlay. It is difficult to load balance a physical network fabric in such circumstances. Another problem is that prioritization markings for quality of service and the like are hidden from the underlying physical network fabric, which can cause performance issues.

A further difficulty with physical and virtual network fabrics is that they are often managed by different teams through different tools and processes. Virtual network fabrics are often managed by automated or semi-automated systems while physical network fabrics are often manually managed by technicians.

Accordingly, various examples described herein may provide a system, method or non-transitory computer-readable storage medium that enables improved switching in a network fabric. In an example of the disclosure, a non-transitory computer-readable storage medium containing instructions to control a network fabric comprises instructions that when executed by a processor cause the processor to: assign labels to paths between endpoints in the network fabric: configure switches in the path to communicate data communication packets having the label along the path; and, upon receiving a first data communication packet from a first one of the switches in the network fabric for communication to a destination endpoint over the network fabric, to obtain the label for a path from the first switch to the destination, to communicate the first packet o the destination endpoint and to cause the first switch to communicate subsequent data communication packets corresponding to the first data communication packet over the path An advantage of the examples described herein may include that once a path is set up, network traffic can flow from over the network fabric to its destination endpoint/ network egress without needing to pass through an interim device such as an IP gateway, router or the like. An advantage of use of labelled paths is that they can be set up in advance and only forwarding rules or configuration at edges of the path need to be configured for a data communication session. Another advantage of use of labelled paths is that the configuration at edges can take into account the attributes of the data communication session so as to perform load balancing, provide quality of service, and/or restrict access to certain parts of network fabric. Another advantage is that no encapsulation of data communication packets is needed so load balancing and/or quality of service can work across all transported data communication packets.

Another advantage of using labelled paths is that conflicts with existing protocols can be avoided. An advantage is that data communication packets from networks with overlapping address space can be communicated across the network fabric without needing to pass through an IP gateway. Another advantage is that protocol limitations, such as the limit of 4096 VLANs in a layer 2 OSI fabric, can be avoided.

A further advantage is that mixed virtual and physical network fabrics can be operated and controlled as a single common network fabric. Another advantage is that physical and virtual network fabrics can be interconnected and benefits of each such as performance of switching in physical network fabric can be shared.

Another advantage is that the network fabric can be controlled from a common management/control plane. Physical and virtual switches can be managed from a common system, for example using a protocol such as OpenFlow. As a result, the whole network fabric can support and provide a distributed server default gateway function.

Figure 1:
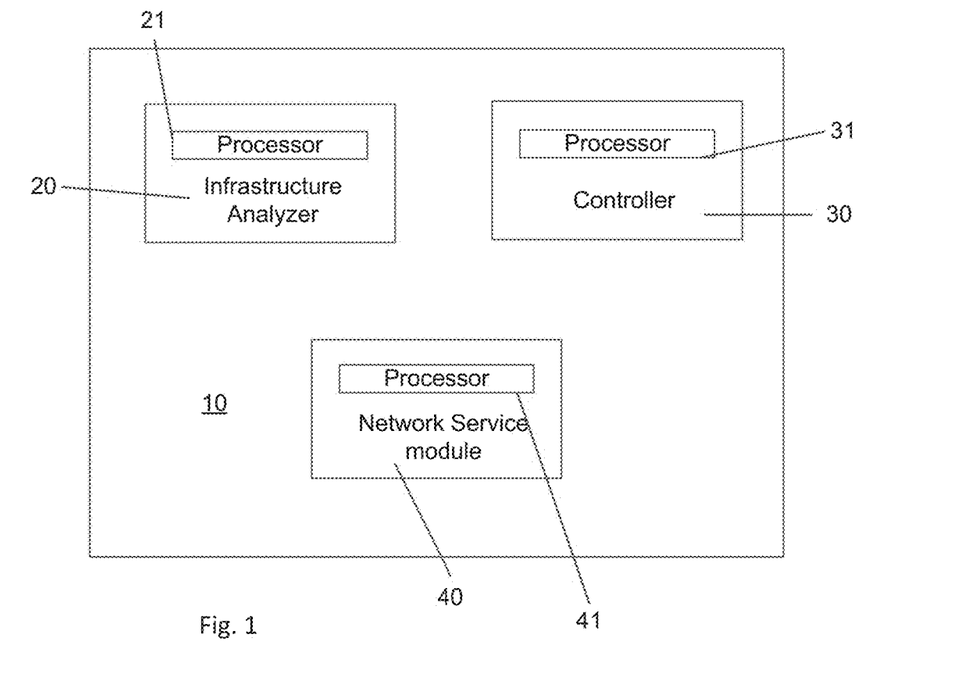
FIG. 1 is a block diagram of a fabric control system according to various examples.

FIG. 1 is a block diagram of a fabric control system according to various examples. FIG. 1 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more electronic circuits, software modules, hardware modules, special purpose hardware (e.g., application specific hardware, application specific integrated circuits (ASICs), embedded controllers, hardwired circuitry, Field Programmable Gate Arrays (FPGA), etc.), or some combination of these.

FIG. 1 shows a fabric control system 10 including an infrastructure analyzer 20, a controller 30 and a network service module 40.

In one example, the infrastructure analyzer 20 includes a processor 21 to execute computer program code to determine paths between endpoints in a network fabric and to assign a label to each path. In one example, the controller 30 includes a processor 31 to execute computer program code to configure switches in the path to direct data communication packets having the label along the path. In one example, the network service module 40 includes a processor 41 to execute computer program code to receive a first data communication packet from a first one of the switches in the network fabric for communication to a destination over the network fabric, to query the infrastructure processor to obtain the label for a path from the first switch to the destination, to direct the first data communication packet to the destination and to cause subsequent data communication packets corresponding to the first data communication packet to be directed over the path.

Figure 2:
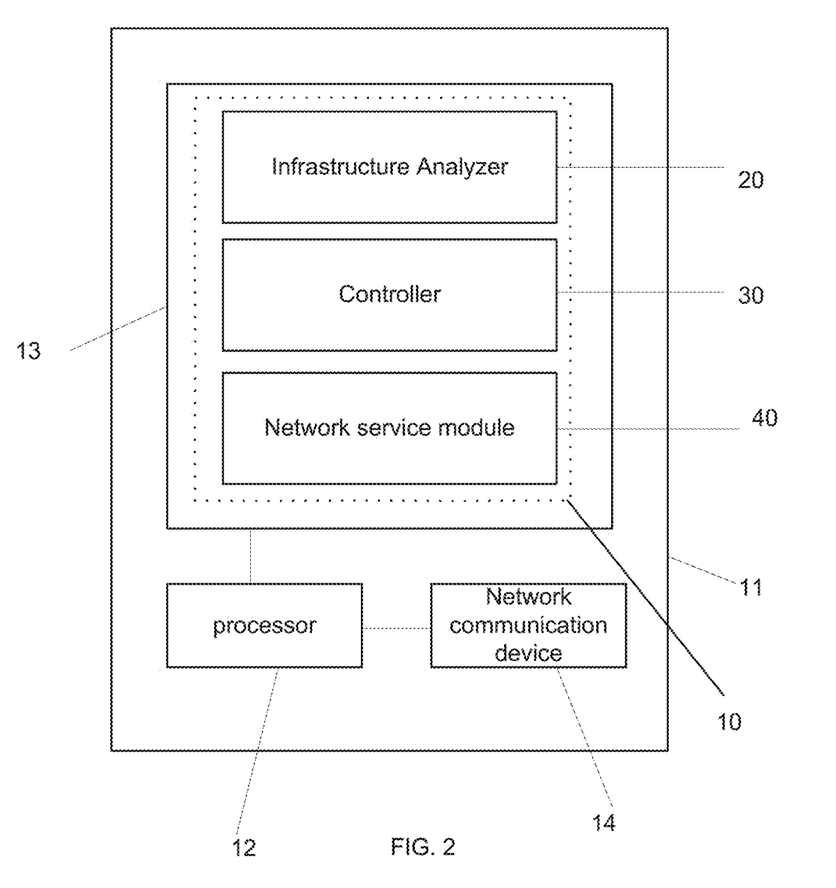
FIG. 2 is a block diagram of a fabric control system according to various examples.

FIG. 2 shows a fabric control system 10 according to various examples.

FIG. 2 shows the fabric control system 10 including the infrastructure analyzer 20, controller 30 and network service module 40 as components of a software defined network (SDN) controller 11. In one example, the fabric control system 10 is a plug-in to the SDN controller 11.

In one example, the fabric control system 10 is a component interfaces with the SDN controller 11. In one example, the fabric control system is a software plug-in.

In one example, the SDN controller 11 includes a processor 12, a memory 13, and a network communication device 14 that is connectable to the network fabric. In one example, the processor 12 is a central processing unit (CPU) that executes commands stored in the memory 13. In another example, the processor 12 is a semiconductor-based microprocessor that executes commands stored in the memory 13. In one example, the memory 13 includes any one of or a combination of volatile memory elements (e.g., RAM modules) and non-volatile memory elements (e.g., hard disk, ROM modules, etc.).

In one example, the processor 12 executes computer program code from the memory 13 to execute the fabric control system 10 including the infrastructure analyzer 20, controller 30 and network service module 40.

In one example, the network communication device 14 is connectable to the network fabric to receive data communication packets from the switches and to enable the switches to be configured by the fabric control system 10. The network communication device 14 may be connectable to the network fabric by one or more connections including IEEE 802.11 type, TCP/IP, Ethernet, Radio Frequency, fiber-optic or other type link.

Figure 3:
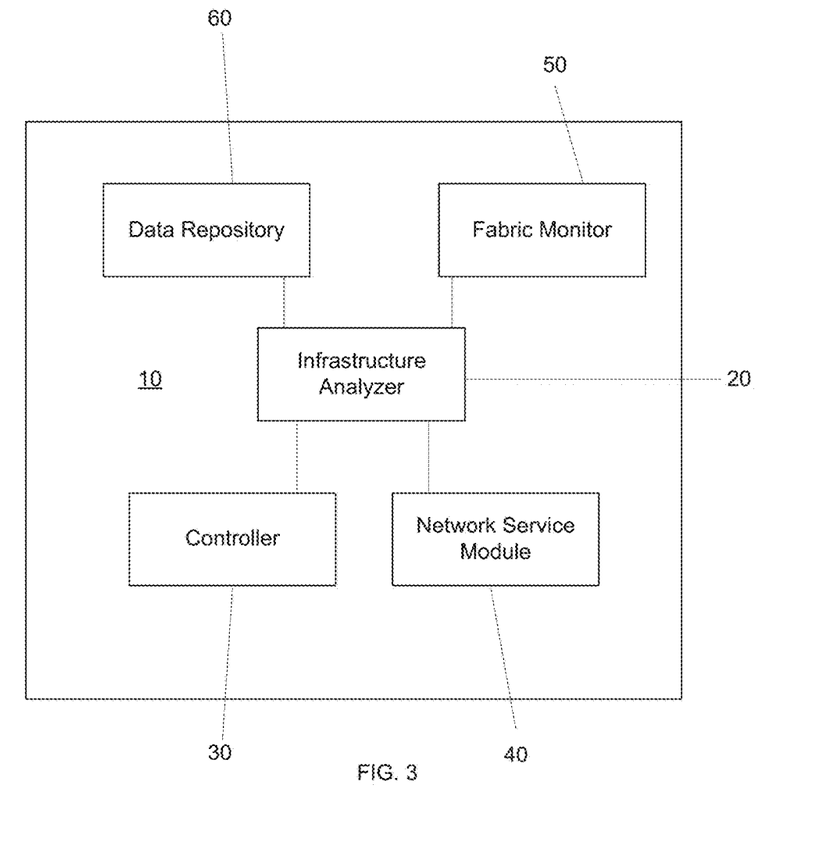
FIG. 3 is a block diagram of a fabric control system, according to various examples.

FIG. 3 is a block diagram of a fabric control system according to various examples. FIG. 3 includes particular components, modules, etc. according to various examples. However, in different examples, more, fewer, and/or other components, modules, arrangements of components/modules, etc. may be used according to the teachings described herein. In addition, various components, modules, etc. described herein may be implemented as one or more electronic circuits, software modules, hardware modules, special purpose hardware (a g., application specific hardware, application specific integrated circuits (ASICs), embedded controllers, hardwired circuitry, Field Programmable Gate Arrays (FPGA), etc.), or some combination of these.

In one example, the infrastructure analyzer, controller and network service module are components of a software defined network (SDN) controller. In one example, the fabric control system 10 is a plug-in to an SDN controller such as the HP Networking VAN SDN controller.

In one example, the fabric control system 10 includes a fabric monitor 50 to monitor for changes to the network fabric. In one example, upon detecting a change in the network fabric, such as addition or removal of an endpoint, the fabric monitor 50 causes the infrastructure analyzer 20 to update the paths and assign new labels where necessary. The controller 30 is then caused to update the switch configuration.

In one example, the fabric monitor 50 monitors the SDN controller, for example the Topology Manager of the HP Networking VAN SDN controller, for signals that addition or removal of network devices or links has occurred. In one example, the fabric monitor determines paths between endpoints from topology information obtained from the SDN controller.

In one example, a shortest path (or the shortest paths if there are multiple paths of the same length) between each of any two endpoints in the network fabric is determined and a label is assigned to each path. In one example, paths are determined using a modified Yen's Ranking Loopless Paths Algorithm to obtain an array of paths of equal shortest distance between any two endpoints in the network fabric. It will be appreciated that other path planning algorithms can be used. In one example, an endpoint may be a network device such as a computer terminal, printer, multi-functional device or server, it may alternatively be an ingress or egress point to the network fabric such as a modem, switch, access point, router, firewall or other gateway to a network outside the control of the fabric control system 10.

In one example, the labels are Multi Protocol Label Switching, MPLS, labels. In one example, the labels are 20 bit MPLS labels. In another example, the labels are QinQ (IEEE802.1ad), Provider Backbone Bridging (IEEE802.1ah) label, or other label types.

In one example, the fabric control system 10 further comprises a data repository 60 to store the MPLS labels and data on the MPLS label's respective path. In one example, the data on the path includes data identifying the start and destination of the path. In one example, upon receiving a source and destination in the network fabric, the infrastructure analyzer 20 queries the data repository 60 and returns the label corresponding to a path in the data repository 60 matching a requested source and destination.

In one example, the controller 30 configures switches in the path to direct a received data communication packet having the MPLS label to a predetermined egress port in the switch that has been associated with the path and is connected to the next switch or other network element in the path.

In one example, the network service module 40 causes subsequent data communication packets corresponding to the first data communication packet to be directed over the path by configuring, such as by programming, the first switch to apply the MPLS label for the path to data communication packets corresponding to the first packet. As the subsequent data communication packets have the MPLS label for the path, the configuration of the switches in the path by the controller causes the subsequent data communication packets to be switched along the path to the destination.

In one example, the first switch is configured to treat received data communication packets as subsequent data communication packets if they match at least selected attributes of the first packet of: source network address, destination network address, ingress port at the first switch and a VLAN identifier.

In one example, subsequent data packets are modified by the first switch in addition to the application of the MPLS label. In one example, modifications include selected ones of: clearing a VLAN identifier field, replacing a source MAC address with that of the gateway interface of a destination network, and replacing a destination MAC address with the MAC address of the destination IP address. In one example, the fabric control system 10 may be used for other functions such as addition of alternate protocol information to data communication packets (such as the addition of an IPv6 address to an IPv4 addressed data communication packet), providing shared services to tenants having overlapping network address spaces (which is possible because the MPLS label switching can operate independently of network addressing), OSI layer-2 switching, OSI layer 3-4 routing, and/or load balancing of the network fabric.

In one example, the configuration of switches by the controller 30 based on MPLS labels is performed periodically, for example daily. In one example, the configuration of switches is updated only when there has been network fabric changes to require it. In one example, the subsequent data communication packets may be labelled with a tenant identifier to differentiate tenants of the network fabric. In one example, the tenant identifier is used to limit the parts of the network fabric that may be used for the particular tenant.

In one example, configuration of switches by the network service module 40 is performed upon receiving the first packet. In this example, configuration of the switches to define MPLS labelled paths can be established ahead of time. In this example, configuration of the first switch by the network service module 40 to cause subsequent data communication packets to flow along the defined MPLS labelled paths can be done at the instant it is needed, configuration of the remainder of the path having been done previously.

In one example, configuration or programming of switches is performed by forwarding instructions to the respective switch using the Openflow protocol. It will be appreciated that other protocols could also be used.

In one example, addition to the network fabric is performed by connecting a new network element, enabling Openflow protocol in the network element and directing it to the SDN controller.

In one example, the fabric control system includes a firewall to reject selected data communication packet types, addresses or protocols or to redirect selected data communication packet types, addresses or protocols to a different endpoint than that designated as the destination by the first data communication packet. In another example, and in a similar scenario to the segmentation by tenants discussed above, the fabric control system may control the network fabric to operate a demilitarized zone or other perimeter network, for example for bring your own device (BYOD) situations. In such an example, endpoints corresponding to unknown devices may restricted to allow use of only selected parts of the network fabric until such time as they are approved either automatically (such as by virus scanning, checking for operating system updates, policy compliance etc.) or manually.

FIGS. 4a-4d are a schematic diagrams illustrating control of switching in a network fabric, according to various examples. FIGS. 4a-4d include particular components, modules, etc. according to various examples. However, in different examples, more, fewer, and/or other components, modules, arrangements of components/modules, etc. may be used according to the teachings described herein. In addition, various components, modules, etc. described herein may be implemented as one or more electronic circuits, software modules, data structures, encoded data, files, data streams hardware modules, special purpose hardware (e.g., application specific hardware, application specific integrated circuits (ASICs), embedded controllers, hardwired circuitry, Field Programmable Gate Arrays (FPGA), etc.), or some combination of these. In discussing FIGS. 4a-4d, reference may be made to the diagrams of FIGS. 1, 2 and 3, to provide contextual examples. Implementation, however, is not limited to those examples.

Figure 4A:
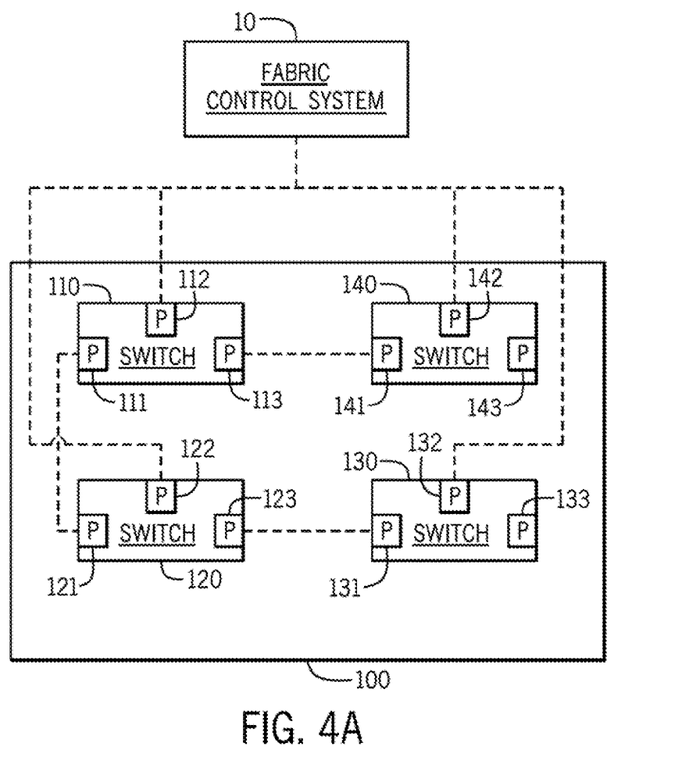
FIGS. 4a-4d are a schematic diagrams illustrating control of switching in a network fabric, according to various examples.

FIG. 4a shows a network fabric 100 connected to a fabric control system 10.

In one example, the network fabric 100 includes switches 110, 120, 130, 140, each having respective ports 111-113; 121-123; 131-133; 141-143. In one example, each switch 110-140 is connected to the fabric control system 10. Connections between ports and between switches and the fabric control system in this example are shown by dashed lines. Flow of data communication packets is shown by solid lines.

In the example of FIGS. 4a-4d, a limited number of switches are shown but it will be appreciated that any number of switches can be utilized, In this example, and as discussed with reference to FIGS. 1, 2 and 3 above, the infrastructure analyzer has identified the shortest paths between endpoints in a network fabric and has assigned a label to each path. The labels have been written to the data repository. The controller has configured the switches in each path with the label and a forwarding instruction to the corresponding egress port so as to direct data communication packets having the label along the path. In the case of the path from switch 110 to 130, intermediate switch 120 has been configured to forward packets labelled with the path's label to its third port 123.

Figure 4B:
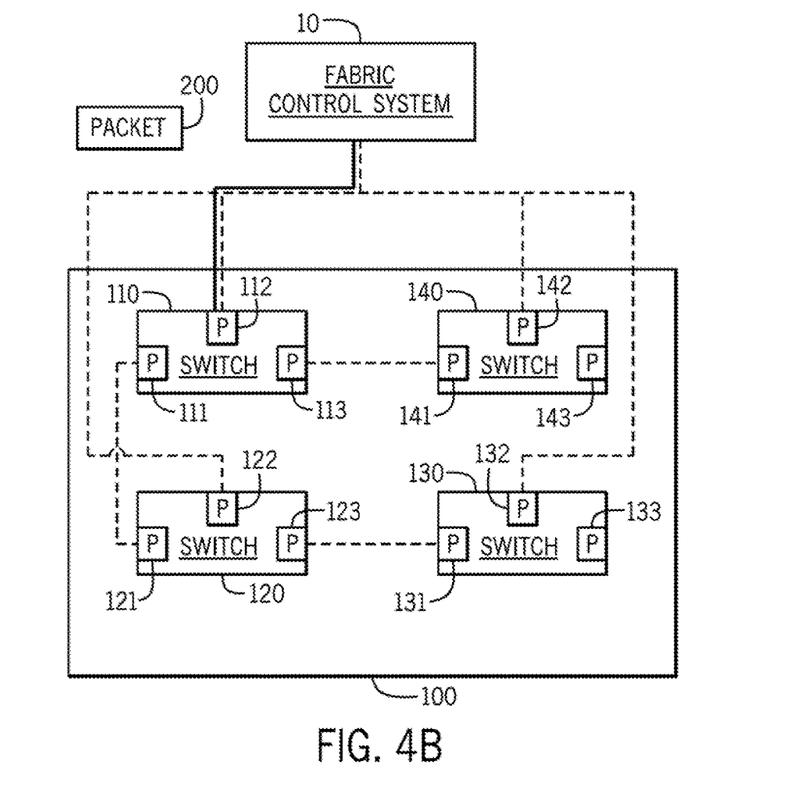
Figure 4C:
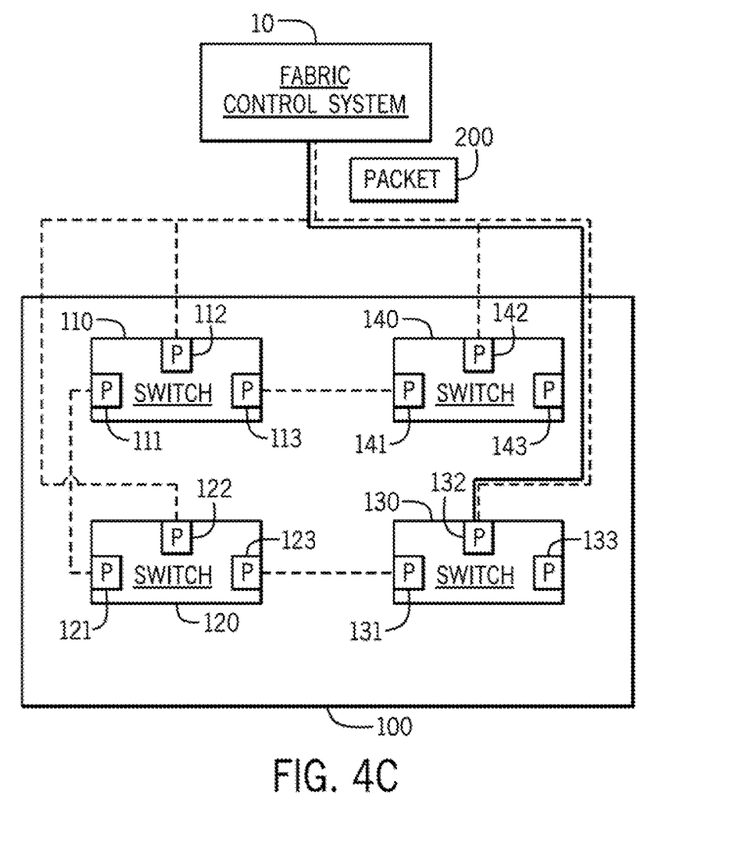

In one example, a first switch 110 receiving a first data communication packet 200 is configured to forward the first data communication packet to the fabric control system 10 as is shown in FIG. 4b. In this example, a first data communication packet is identified as such because it has no MPLS label matching a path at the switch and there is no configuration at the first switch 110 in respect of the data communication packet for applying an MPLS label. Typically, a first data communication packet is the first received packet in a new session, In one example, the fabric control system 10 identifies the packet based on source/destination IP, VLAN ID and ingress port information. In one example, the fabric control system 10 modifies the packet header fields of communication packet 200 as required and then forwards the first data packet communication packet 200 directly to destination switch (in this example, switch 130) which receives it on port 132 (as is shown in FIG. 4*c*) and then sends the packet out the port that the destination endpoint of the first data communication packet 200 is connected to.

In one example, after the first data communication packet is analyzed and forwarded, the data repository 60 is queried to obtain a label for a path between the first 110 and destination 130 switches across the network fabric 100.

In one example, where there are multiple paths between the first 110 and destination 130 switches, usage of the paths is monitored and the data repository 60 provides the least used path.

Figure 4D:
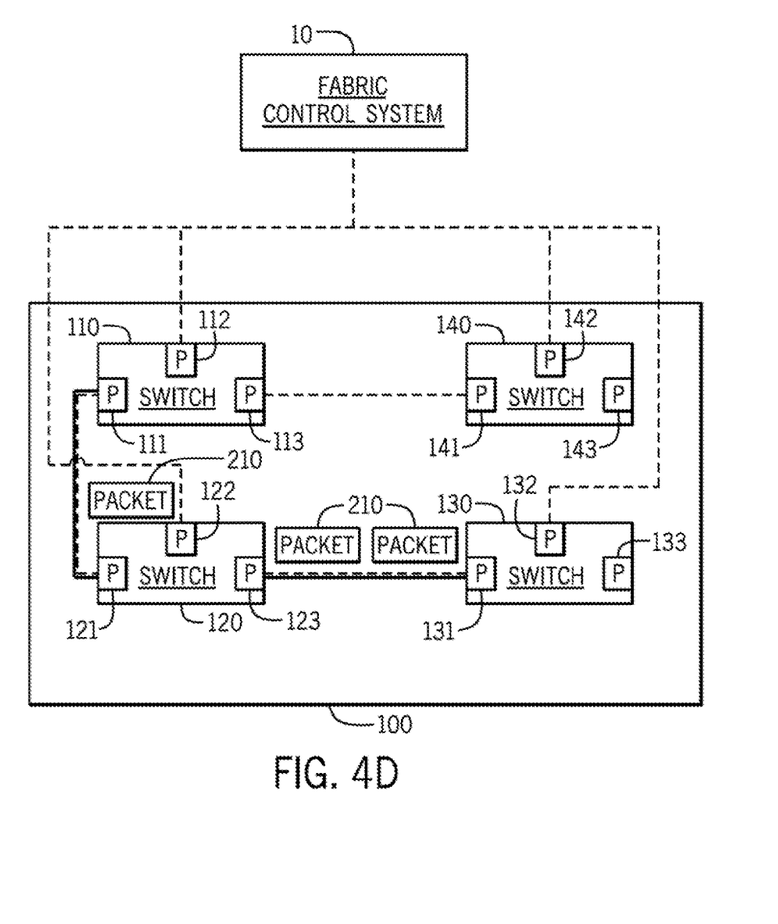

In one example, having obtained the MPLS label identifying the path, the network service module 40 creates a rule based on the information from the first data communication packet and the MPLS label. In one example, the network service module uses the OpenFlow protocol to program forwarding information at the first switch 110 and destination switch 130. In one example, the programmed forwarding information includes applying the MPLS label to subsequent data communication packets that match selected attributes of the first data communication packet 200. In one example, the MPLS label is applied to a header of subsequent data communication packets. In one example, due to the programmed forwarding information, all subsequent data communication packets 210 matching the attributes (for example, source subnetwork, tenant, destination IP address) will have the MPLS label applied at the first switch 110 be forwarded directly through the network fabric from the first switch 110 via second switch 120 to the destination switch 130 and are not sent to the fabric control system 10, as is shown in FIG. 4*d*.

In one example, a data communication packet arriving at a switch matches one of three possibilities:
  i) it includes an MPLS label that corresponds to a labelled path configured in the switch. In this situation, the packet is switched along the path through the port on the switch corresponding to the label;
  ii) it matches attributes for a subsequent data communication pattern for which the switch is configured to apply an MPLS label. In this situation, the switch applies the MPLS label and the packet is switched along the path through the port on the switch corresponding to the label.
  iii) it matches neither i) or ii). In this situation, the data communication packet is treated as a first data communication packet and is communicated to the fabric control system 10.

In one example, a data communication packet is directed to the fabric control system 10 to be treated as a first data communication packet by detection at the first switch 110 of an address resolution packet corresponding to the data communication packet that includes attributes that do not match i) or ii) above.

In one example, the network fabric includes physical and virtual network switches. In one example, a path includes both a physical and a virtual switch. For example, a virtual switch may be connected to a physical switch or vice-versa.

Figure 5:
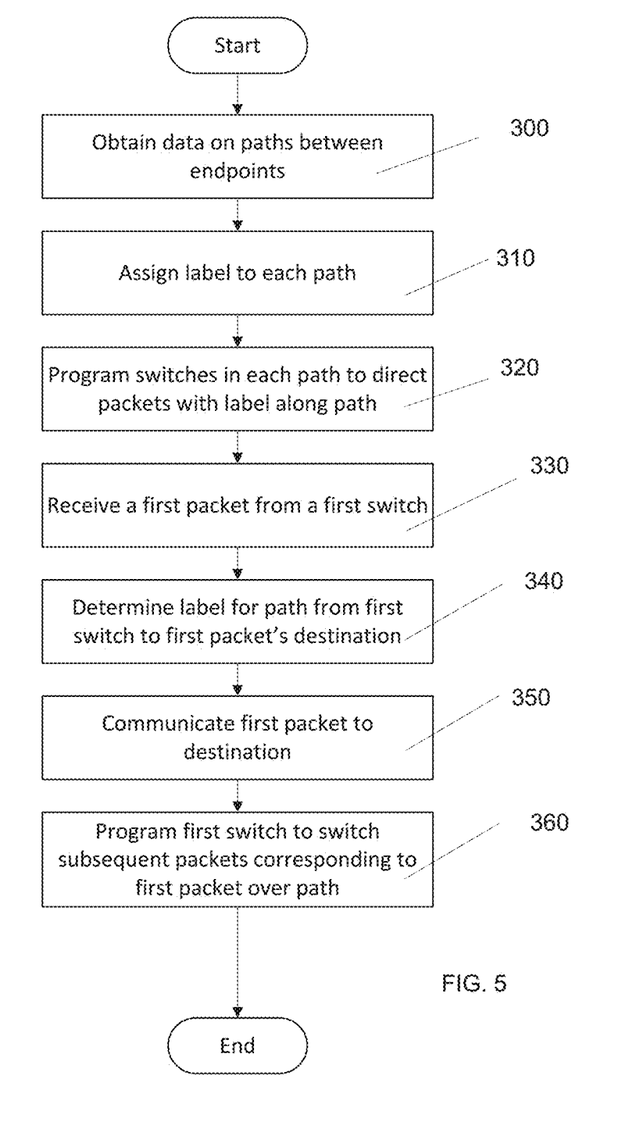
FIG. 5 is a flow diagram depicting steps taken to implement fabric control according to various examples; and, FIG. 6 is a flow diagram depicting steps taken to implement fabric control according to various examples.

FIG. 5 is a flow diagram depicting steps taken to implement fabric control according to various examples. In discussing FIG. 5, reference may be made to the diagrams of FIGS. 1 2, 3 and 4*a*-4*d*, to provide contextual examples. Implementation, however, is not limited to those examples.

At block 300, data on paths between endpoints in a network fabric is obtained. At block 310, a label is assigned to each path. At block 320, switches in the path are programmed to direct data communication packets having the label along the path.

Continuing at block 330, a first packet for communication to a destination over the network fabric is received from a first switch of the switches in the network fabric. At block 340, the label for a path from the first switch to the destination is identified. At block 350, the first packet is communicated to the destination and at block 360, the first switch is programmed to switch subsequent packets corresponding to the first packet over the path.

Figure 6:
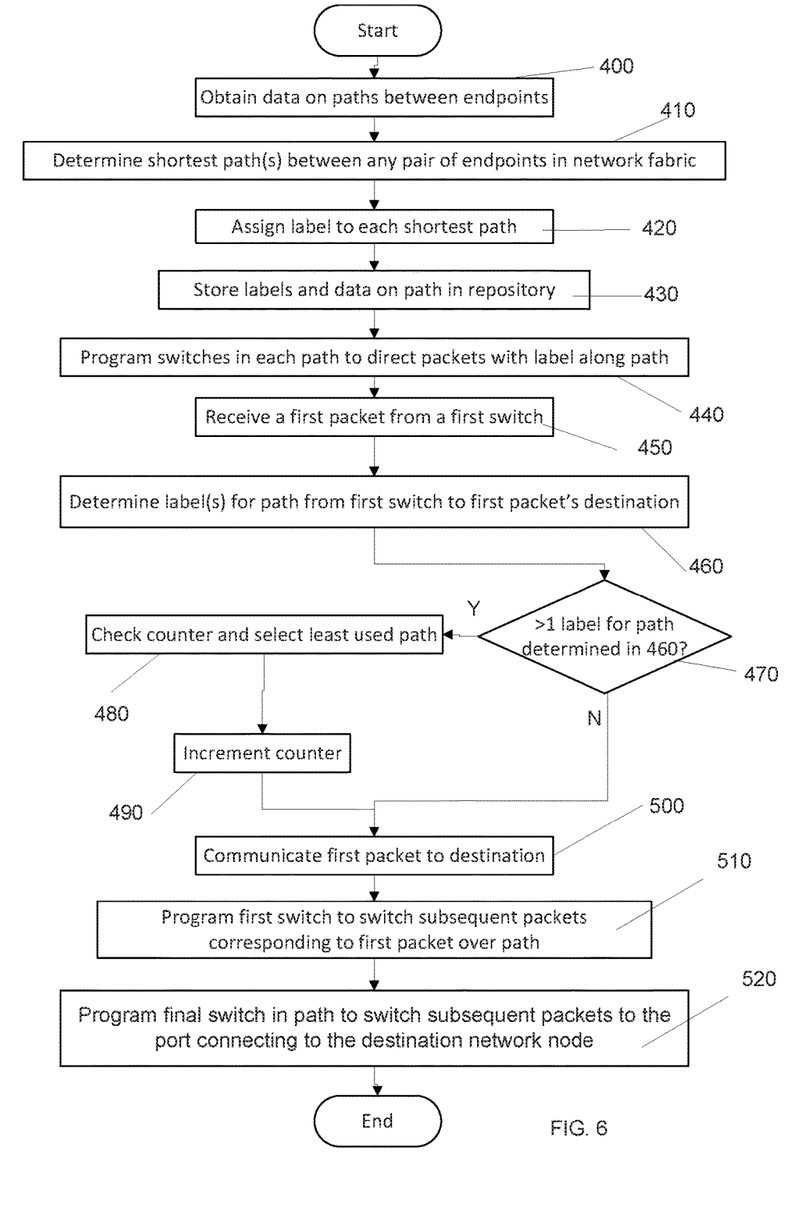

FIG. 6 is a flow diagram depicting steps taken to implement fabric control according to various examples. In discussing FIG. 6, reference may be made to the diagrams of FIGS. 1, 2, 3, 4*a*-4*d* and 5, to provide contextual examples. Implementation, however, is not limited to those examples.

At block 400, data on paths between endpoints in a network fabric is obtained. At block 410, a shortest path (or the shortest paths) between each of any pair of endpoints in the network fabric is determined. At block 420, a label is assigned to each shortest path. At block 430, the labels and data on the label's respective path and endpoints is stored in a data repository such as a database. At block 440, switches in the path are programmed to direct data communication packets having the label along the path.

Continuing at block 450, a first packet for communication to a destination over the network fabric is received from a first switch of the switches in the network fabric. At block 460, the label or labels for a path from the first switch to the destination is identified. At block 470, if multiple labels for a path are identified at block 480, a counter that counts utilization data on each path is consulted to determine the label of multiple labels having the least used path and at step 490, the counter for the path used for the subsequent packets is incremented. At block 500, the first packet is communicated to the destination and at block 510, the first switch is programmed the first switch to switch subsequent packets corresponding to the first packet over the least used path. At block 520 the final switch in the path is programmed to switch subsequent packets to the port connecting to the destination network node. In one example, where there are paths that are equally least used, a random selection of the least used paths is made.

The functions and operations described with respect to, for example, the fabric control system may be implemented as a computer-readable storage medium containing instructions executed by a processor and stored in a memory. The processor may represent generally any instruction execution system, such as a computer/processor based system or an ASIC (Application Specific Integrated Circuit), a Field Programmable Gate Array (FPGA), a computer, or other system that can fetch or obtain instructions or logic stored in memory and execute the instructions or logic contained therein. Memory represents generally any memory configured to store program instructions and other data.

Various modifications may be made to the disclosed examples and implementations without departing from their scope. Therefore, the illustrations and examples herein should be construed in an illustrative, and not a restrictive, sense.

What is claimed is:

1. A system to control a network fabric, the system comprising:
an infrastructure analyzer including at least one processor to execute computer program code to determine paths between endpoints in the network fabric and to assign a label to each path, wherein determining the paths between the endpoints and assigning the label to the each path includes:
determining shortest paths between each pair of endpoints in the network fabric, wherein upon multiple shortest paths being determined between a pair of endpoints:
assigning a label to each of the multiple shortest paths; and
monitoring usage of the each of the multiple shortest paths;
a controller including at least one processor to execute computer program code to configure switches in the path to direct data communication packets having the label along the path; and,
a network service module including at least one processor to execute computer program code to:
receive a first packet from a first switch of the switches in the network fabric for communication to a destination over the network fabric,
query the infrastructure processor to obtain the label for a path from the first switch to the destination, wherein obtaining the label for the path comprises returning the label of the least used path of the each of the multiple shortest paths when multiple shortest paths are determined between the first switch and the destination,
direct the first packet to the destination, and
program the first switch with a rule for the first switch to apply the label to subsequent packets having attributes that match attributes of the first packet, wherein applying the label comprising applying the label of the least used path of the each of the multiple shortest paths when the multiple shortest paths are determined between the first switch and the destination.

2. The system of claim 1, further comprising a fabric monitor to monitor for changes to the network fabric and, upon detecting a change, to cause the infrastructure analyzer to update said paths and to cause said controller to update switch configuration.

3. The system of claim 1, further comprising a data repository to store said labels and data on the label's respective path, the at least one processor of the infrastructure analyzer further executing computer program code to return the label corresponding to a path in the data repository matching a requested source and destination in the network fabric.

4. The system of claim 1, wherein the at least one processor of the network service module further executes computer program code to configures the first switch to apply the label to the subsequent packets that correspond to the first packet.

5. The system of claim 4, wherein the at least one processor of the network service module further executes computer program code to configure the first switch to apply the label to a subsequent packet matching at least selected ones of the first packet of: source network address, destination network address, ingress port at the first switch and a VLAN identifier.

6. The system of claim 1, wherein the controller includes at least one processor to execute computer program code to configure switches in the path to direct a received packet having the label to a predetermined egress port associated with the path.

7. The system of claim 1, wherein the label comprises a Multi Protocol Label Switching, MPLS, label, a QinQ (IEEE802.1ad) or a Provider Backbone Bridging (IEEE802.1ah) label.

8. The system of claim 1, wherein the network fabric comprises a combined physical and virtual network fabric including physical and virtual switches having paths therebetween.

9. The system of claim 1, wherein the attributes of the first packet that are matched to the subsequent packet comprise one or more of the following: a source subnetwork, a tenant, and a destination internet protocol (IP) address.

10. The system of claim 1, wherein the network service module directly forwards the first packet directly to a destination switch in lieu of the first switch forwarding the first packet.

11. A method for controlling a network fabric comprising:
obtaining data on paths between endpoints in a network fabric and assigning a label to each path, comprising determining shortest paths between each pair of endpoints in the network fabric, wherein upon multiple shortest paths being determined between a pair of endpoints:
assigning a label to each of the multiple shortest paths; and
monitoring usage of the each of the multiple shortest paths,
storing the assigned labels in a data repository;
receiving a request for a label for a path from a source to a destination in the network fabric;
returning a label corresponding to the path from the data repository, wherein upon multiple shortest paths between the source and the destination being determined, returning the label of the least used path of the multiple shortest paths;
receiving, from a first switch of the network fabric, a first data communication packet for communication to a destination over the network fabric;
determining the label based on the assigned labels, comprising determining a label from the assigned labels for a given path from the first switch to the destination;
programming switches in the given path to direct data communication packets having the determined label along the given path;
communicating the first packet to the destination; and
programming the first switch, wherein programming the first switch comprises programming the first switch with a rule for the first switch to apply the determined label to subsequent data communication packets having attributes that match attributes of the first data communication packet, wherein applying the determined label comprising applying the label of the least used path of the each of the multiple shortest paths.

12. The method of claim 11, wherein the attributes of the first packet that are matched to the subsequent packet comprise one or more of the following attributes a source network address, a destination network address, an ingress port at the first switch and a VLAN identifier.

13. The method of claim 11, wherein programming switches in the path to direct data communication packets having the label along the path includes programming switches in the path to direct a received data communication packet having the label to a predetermined egress port associated with the path.

14. A non-transitory computer-readable storage medium containing instructions to control a network fabric, the instructions when executed by a processor causing the processor to:

assign labels to paths between endpoints in the network fabric, comprising determining shortest paths between each pair of endpoints in the network fabric, wherein upon multiple shortest paths being determined between a pair of endpoints:

assigning a label to each of the multiple shortest paths; and monitoring usage of the each of the multiple shortest paths;

configure switches in the path to communicate data communication packets having the label along the path; and, upon receiving a first data communication packet from a first one of the switches in the network fabric for communication to a destination endpoint over the network fabric, obtaining the label for a path from the first switch to the destination, wherein obtaining the label for the path comprises returning the label of the least used path of the each of the multiple shortest paths when multiple shortest paths are determined between the first switch and the destination, communicating the first packet to the destination endpoint, and programming the first switch with a rule for the first switch to apply the label to subsequent data communication packets having attributes that match attributes of the first data communication packet, wherein applying the label comprising applying the label of the least used path of the each of the multiple shortest paths when the multiple shortest paths are determined between the first switch and the destination.

* * * * *